(12) United States Patent
Browne

(10) Patent No.: US 7,253,126 B2
(45) Date of Patent: Aug. 7, 2007

(54) SHELF LINER

(75) Inventor: William R. Browne, Saratoga Springs, NY (US)

(73) Assignee: Reza Aliabadi, Nashville, TN (US)

( * ) Notice: Subject to any disclaimer, the term of this patent is extended or adjusted under 35 U.S.C. 154(b) by 359 days.

(21) Appl. No.: 10/639,622

(22) Filed: Aug. 13, 2003

(65) Prior Publication Data

US 2005/0037190 A1 Feb. 17, 2005

(51) Int. Cl.
*D03D 9/00* (2006.01)
*B32B 27/12* (2006.01)
*B32B 27/04* (2006.01)

(52) U.S. Cl. .............. 442/2; 442/20; 442/38; 442/50; 442/56; 442/58

(58) Field of Classification Search ............ 442/2, 442/20, 38, 50, 56, 58
See application file for complete search history.

(56) References Cited

U.S. PATENT DOCUMENTS

| | | | |
|---|---|---|---|
| 3,360,422 A | 12/1967 | Desch | |
| 4,196,243 A * | 4/1980 | Sachs et al. | 428/147 |
| 4,828,897 A | 5/1989 | Staneluis et al. | |
| 5,120,587 A * | 6/1992 | McDermott et al. | 428/40.6 |
| 5,506,030 A * | 4/1996 | Landers et al. | 428/143 |
| 5,580,651 A | 12/1996 | Kerman | |
| 5,707,903 A | 1/1998 | Schottenfeld | |
| 5,854,144 A | 12/1998 | Hawley | |
| 5,863,845 A | 1/1999 | Owen | |
| 5,874,371 A | 2/1999 | Owen | |
| 6,022,617 A | 2/2000 | Calkins | |
| 6,130,174 A | 10/2000 | Hawley et al. | |
| 6,159,583 A | 12/2000 | Calkins | |
| 6,221,796 B1 | 4/2001 | Hawley et al. | |
| 6,838,147 B2 * | 1/2005 | Burns et al. | 428/95 |
| 2003/0036323 A1 * | 2/2003 | Aliabadi | 442/40 |
| 2003/0060110 A1 | 3/2003 | Desai | |
| 2003/0104205 A1 | 6/2003 | Brodeur, Jr. et al. | |

* cited by examiner

Primary Examiner—Ula C. Ruddock

(57) ABSTRACT

The shelf liner is a multi-layered thermoplastic composite sheet of consistent thickness, with a non-slip bottom side and a decorative top side. A decorative top sheet is fused to a top surface of a substrate layer. The substrate layer comprises a nonwoven fabric or material that is coated on both sides, and can be fully impregnated, with a foamed plasticized polyvinyl chloride. The foamed plasticized polyvinyl chloride coating on the bottom side of the substrate layer gives the shelf liner a non-slip characteristic. An interlayer of polyvinyl chloride plastisol is disposed between the top sheet and the substrate to enhance the fused bonding of the layers. A bottom surface of the substrate layer may be fully or partly covered with a bottom coating to modify the non-slip nature of the shelf liner.

11 Claims, 4 Drawing Sheets

SHELF LINER

BACKGROUND OF THE INVENTION

1. Field of the Invention

The present invention relates to decorative non-slip liners, and more specifically to a shelf liner that comprises a polyvinyl chloride (PVC) top layer laminated or fused to a non-slip bottom layer via a PVC plastisol interlayer. The non-slip bottom layer consists of a non-woven fabric coated on both sides with foamed plasticized polyvinyl chloride.

2. Description of the Related Art

In the past, various liners have been made for covering surfaces, such as shelves, drawer interiors, countertops, and the like. The liners are typically both protective and decorative. One common form of liner is simply a plastic film with an adhesive backing coating one side. This simple liner does provide protection and decoration of a surface, but the thin film fails to hide surface flaws or unevenness. The adhesive backed liner cannot be removed for cleaning and, if it is removed, often leaves behind an adhesive residue.

Other liners are laminated, including a top protective and decorative layer adhesively bonded to a frictionalized coated pad or matt, such as a scrim or non-woven fabric bearing a frictionalizing coating. These liners often have a rough-textured surface that is reflective of the roughly textured scrim or matt substrate. Additionally, excessive pressure or contact force used during the manufacturing process distorts the surface with a rougher appearance and random thickness variations. These liners are more difficult to clean, and give a different appearance.

Additional problems exist with laminated liners. Laminated liners are prone to deformation with age, as chemical migration between different chemicals among the various layers results in differential shrinkage of the layers, causing curling of the liner. Chemical migration, and particularly migration of plasticizers from plasticized coated scrims and plasticized PVC top layers into the adhesive can compromise the strength of the adhesive, causing the laminated liner to delaminate. Chemical migration can also harm the application surface on which the liner is used, leaving behind a film on the application surface after the liner is removed.

U.S. Pat. No. 5,707,903, issued on Jan. 13, 1998 to H. Schottenfeld discloses a laminated liner comprising a non-slip pad and a sheet covering. The sheet covering is adhesively attached to the non-slip pad. Additionally, the non-slip pad includes a plurality of open cells extending through the non-slip pad.

U.S. Pat. No. 5,863,845, issued on Jan. 26, 1999 to T. Owen, discloses a surface covering that includes a substrate that is non-skid coated. A decorative top sheet is adhered to the substrate with an adhesive. U.S. Pat. No. 5,874,371, issued on Feb. 23, 1999 to T. Owen, discloses a surface covering having a non-skid coated substrate, with a decorative top sheet adhered to the substrate. The bottom surface of the substrate is at least partially coated with a cured polyvinyl-containing resin.

U.S. Pat. No. 6,022,617, issued on Feb. 8, 2000 to M. Calkins, discloses a laminated non-slip liner or mat having a layer of a non-woven material with a pattern of a high friction material printed on one side. The printed pattern of relatively high friction material is a matrix of latex or PVC projections. On the other side of the non-woven material layer, a decorative vinyl sheet is affixed by an adhesive. U.S. Pat. No. 6,159,583, issued on Dec. 12, 2000 to M. Calkins, discloses a laminated non-slip liner or mat that is similar to the Calkins '617 patent.

U.S. Pat. No. 6,221,796, issued on Apr. 24, 2001 to J. Hawley et al. describes a smooth surfaced foam laminate and a method of making the laminate. The laminate comprises a smooth, continuous, laminated top layer and a discontinuous porous foam bottom layer comprising a loosely woven scrim (cotton fabric) having a rubber or plastic material foamed onto the scrim. The product is usable as a drawer liner, shelf liner or an appliance underlayment. The laminate is distinguishable for requiring a discontinuous porous foam bottom layer comprising rubber or vinyl. U.S. Pat. No. 6,130,174, issued on Oct. 10, 2000 to J. Hawley et al., discloses a smooth surfaced foam laminate and a method of making the laminate similar to the Hawley '796 patent.

U.S. Pat. No. 3,360,422, issued on Dec. 26, 1967 to R. Desch, describes a reinforced cellular floor covering comprising a PVC top surface, an open weave scrim, and a cellular PVC backing layer.

U.S. Pat. No. 4,828,897, issued on May 9, 1989 to J. Staneluis et al. describes reinforced polymeric composites comprising an outer polymeric skin and an inner polymeric foam core with embedded strands.

U.S. Pat. No. 5,854,144 issued on Dec. 29, 1998, to J. Hawley describes a cushioned liner laminate made by adhesively laminating a printed plastic sheet to a top surface of a non-spun polyester fabric having a bottom surface coated with a foam material.

U.S. Pat. No. 5,580,651, issued on Dec. 3, 1996 to M. Kerman, discloses an energy absorbing panel having a foam core and a flexible reinforcing layer that may be non-woven. The flexible reinforcing layer is somewhat permeable to allow the foam to pass therethrough. A decorative layer may be attached to a side of the panel. The panel is made from a liquid foamable polyurethane composition molded along with the reinforcing layer.

U.S. Patent Application Publication US 2003/0060110, published on Mar. 27, 2003, discloses a method for making a foamed sheet comprising steps of extruding a polymeric meld having two or more classes of expanding agents, allowing the expanding agents to expand, depositing the melt on the surface of a permeable carrier whereby the foamed melt penetrates the surface of the carrier, and allowing the composition to set.

U.S. Patent Application Publication US 2003/0104205, published on Jun. 5, 2003, discloses a fabric reinforced closed cell foam composite having a smooth surface that is substantially free of nodular surface irregularities.

U.S. Patent Application Publication US 2003/0036323 A1 by R. Aliabadi, published on Feb. 20, 2003, discloses a plastic shelf liner comprising a top layer of a smooth PVC covering a sandwich layer of a polyester fabric between layers of PVC, the covering attached by a heat bonding process.

None of the above inventions and patents, taken either singly or in combination, is seen to describe the instant invention as claimed. Thus a shelf liner solving the aforementioned problems is desired.

SUMMARY OF THE INVENTION

The shelf liner is a multi-layered thermoplastic composite sheet of consistent thickness, with a non-slip bottom side and a decorative top side. A decorative top sheet is fused to a top surface of a substrate layer. The substrate layer comprises a non-woven fabric or material that is coated on both sides, and can be fully impregnated, with a foamed plasticized polyvinyl chloride. An interlayer of polyvinyl chloride plastisol disposed between the top sheet and the substrate enhances the fused bonding of the layers. The plastisol interlayer provides for cohesive, ionic bonding of the three layers.

The uniformity of construction of the three similar polyvinyl chloride layers results in a composite thermoplastic material that reduces curl, and resists the de-lamination that is characteristic of adhesively laminated products.

Additionally, a bottom coating may be applied to all or to part of the bottom surface of the substrate layer to modify the non-slip nature of the shelf liner.

Accordingly, it is a principal object of the invention to provide a shelf liner that is attractive and durable.

It is another object of the invention to provide a shelf liner that has a reduced tendency to curl as the product ages.

It is a further object of the invention to provide a shelf liner that has a reduced tendency to delaminate as the product ages.

Still another object of the invention is to provide a shelf liner wherein the non-slip nature of the shelf liner is modified by a bottom surface coating.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
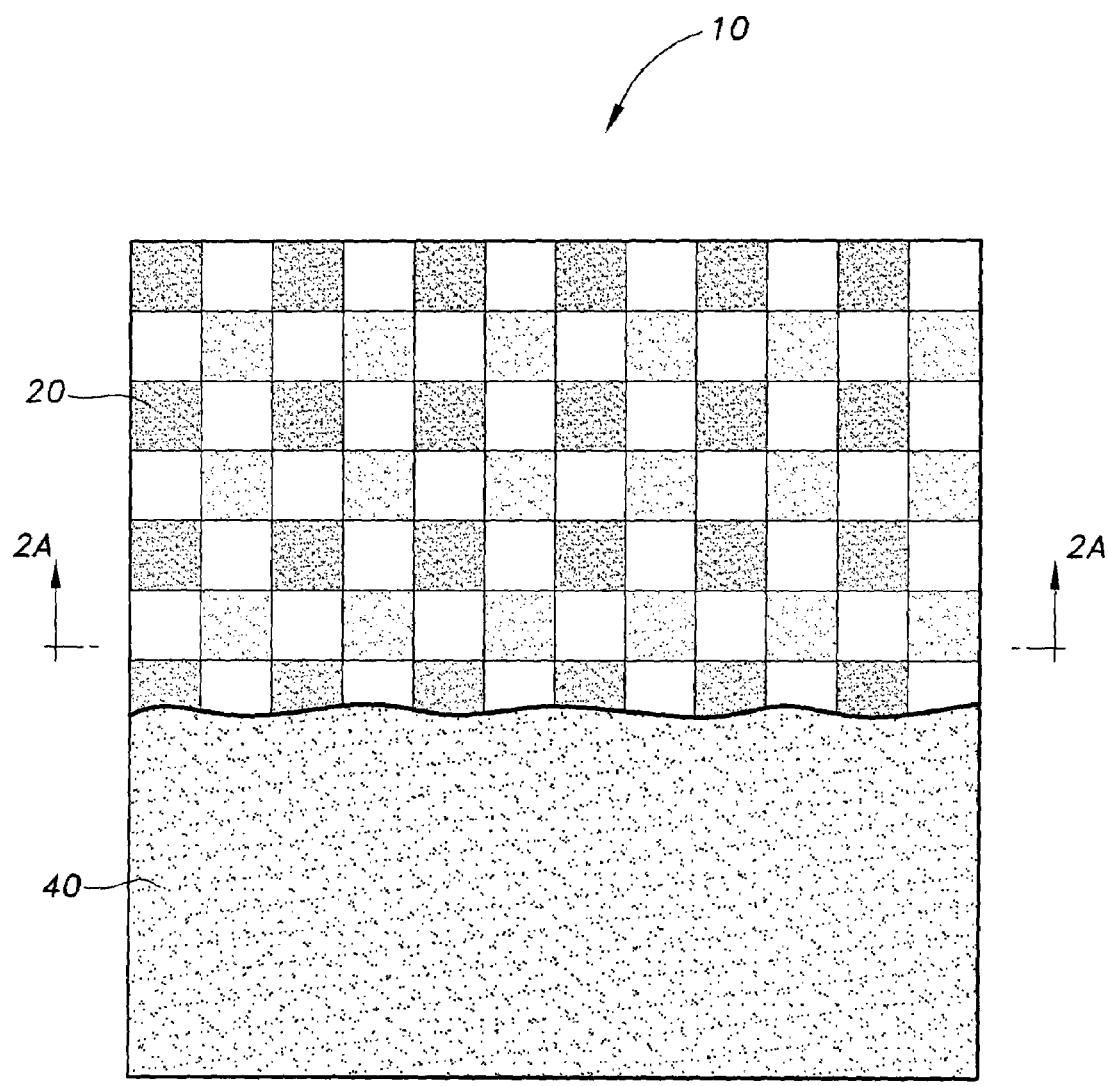
FIG. 1 is a plan view of a shelf liner according to the present invention, with a top layer of the shelf liner cut away to show a substrate layer.

The present invention is a shelf liner, designated generally as 10 in the drawings. The shelf liner 10 is formed primarily of layers of plasticized polyvinyl chloride materials, fused together to form a durable liner with a non-skid bottom surface and a decorative and protective top surface. The shelf liner is illustrated in FIG. 1, with a top sheet 20 cut-away to show a foamed plasticized polyvinyl chloride substrate layer 40.

Figure 2A:
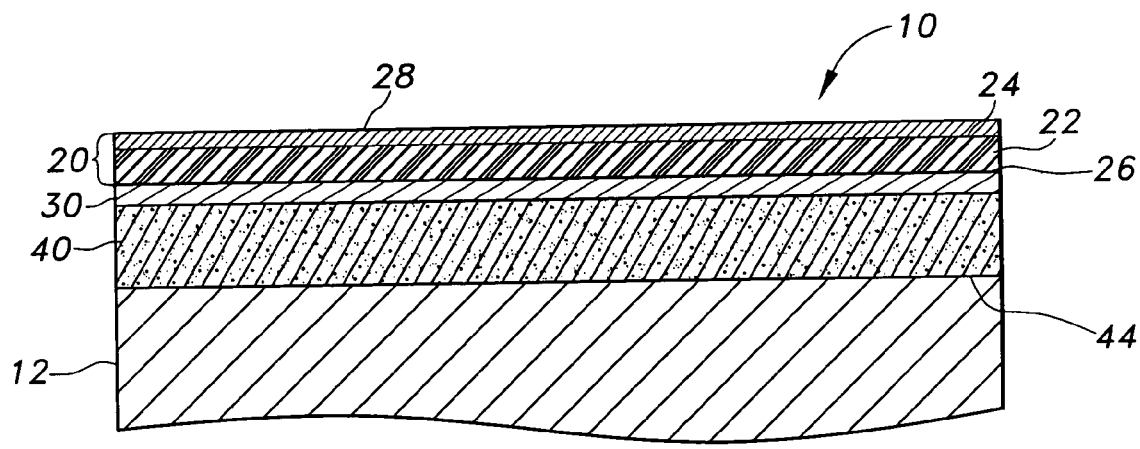
FIG. 2A is a section view drawn along lines 2A-2A of FIG. 1, showing the layered construction of a shelf liner according to the present invention.
Figure 2B:
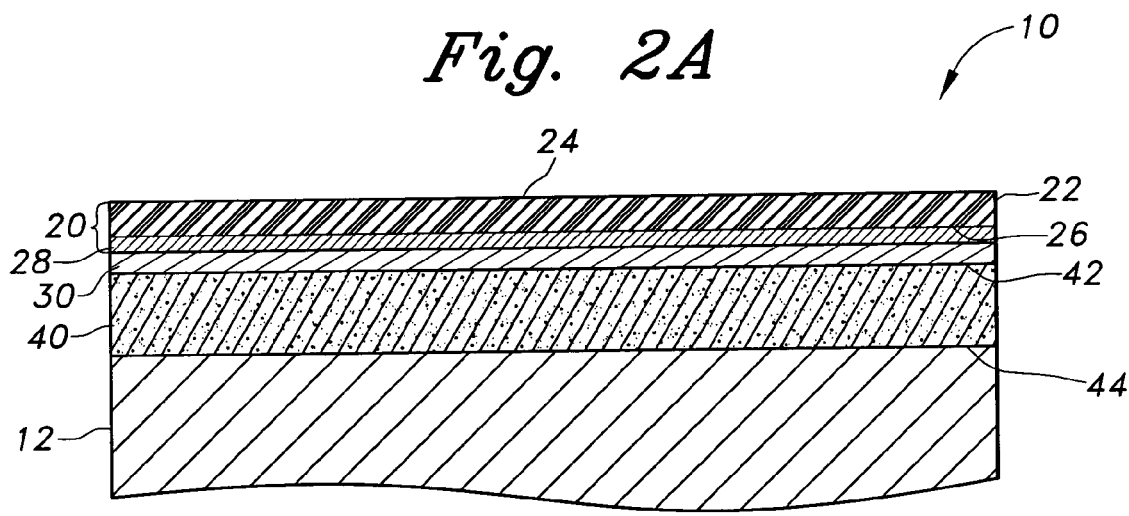
FIG. 2B is a section view similar to FIG. 2A showing the layered construction of a first alternate embodiment of a shelf liner according to the present invention.
Figure 2C:
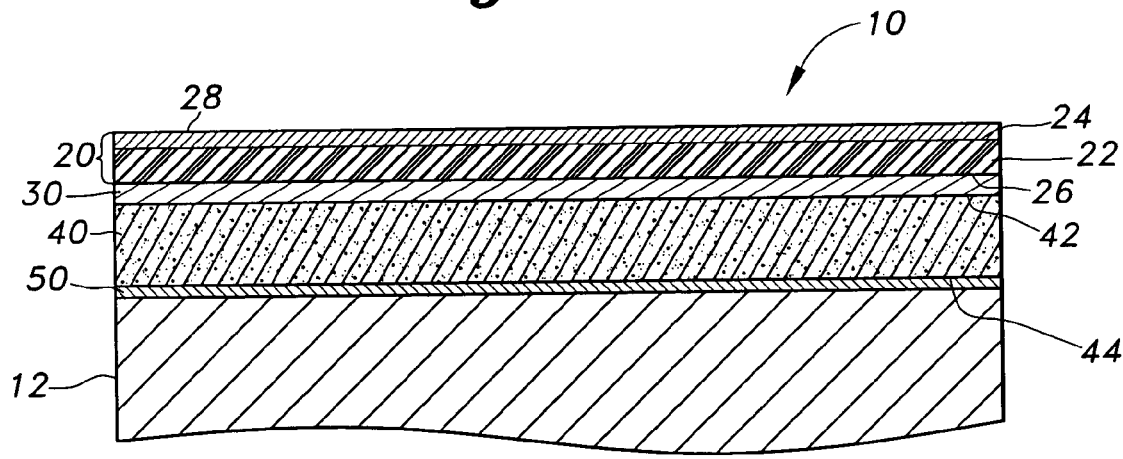
FIG. 2C is a section view similar to FIG. 2A showing the layered construction of a second alternate embodiment of a shelf liner according to the present invention.

Turning now to FIGS. 2A-2C, the layers of the shelf liner 10 can be seen in greater detail. The substrate layer 40 has a top surface 42 and a bottom surface 44. The top sheet 20 comprises a thin polyvinyl chloride film 22 having top and bottom surfaces 24,26, and optionally a decorative coating 28. In use, the shelf liner 10 is placed on an application surface 12, such as a desk, shelf, countertop, etc., with the substrate bottom surface 44 in contact with the application surface 12. Because of the somewhat tacky, frictionalized nature of the surfaces of the foamed plasticized polyvinyl chloride material of the substrate layer 40, the substrate bottom surface 44 has a non-slip characteristic, giving the shelf liner 10 the tendency to resist movement in the plane of the substrate bottom surface 44 when the substrate bottom surface 44 contacts the application surface 12.

The top sheet 20 is fused to the substrate layer 40. A polyvinyl chloride plastisol interlayer 30 between the top sheet 20 and the substrate layer 40 facilitates the fusing of the layers, improving the bond between the top sheet 20 and the substrate layer 40. The bonding between the top sheet 20 and the substrate layer 40 is a cohesive, ionic bonding of the layers, rather than adhesive, or adherent bonding. The polyvinyl chloride plastisol interlayer 30 may be modified by the addition of elastic microspheres to vary the resilience and thickness of the shelf liner 10, the elastic microspheres being admixed in the polyvinyl chloride plastisol.

The decorative coating 28 can be disposed on the top surface 24 of the thin polyvinyl chloride film 22. Alternatively, as shown in FIG. 2B, the decorative coating can be disposed on the bottom surface 26 of the thin polyvinyl chloride film 22, the thin polyvinyl chloride film 22 being clear or transparent. The decorative coating 28 may be a solvent based polyvinyl chloride resin ink, a water-based polyester which may be a clear or pigmented ink or coating, a water-based polyurethane which may be a clear or pigmented coating, a UV cured solid clear or pigmented coating, or other suitable material printed or coated onto the thin polyvinyl chloride film 22.

With the decorative coating 28 disposed on the top surface 24 of the thin polyvinyl chloride film 22, various additives can be included in the material of the decorative coating 28, such as fine rubber particles or other materials, to alter top surface friction, giving the top as well as the bottom of the shelf liner a non-slip characteristic.

As an alternative to the decorative coating 28, the shelf liner 10 can be decorated by introducing pigments or other additives directly into the interlayer 30. A clear thin polyvinyl chloride film 22 over the decorated interlayer 30 can be polished, or matte finished to give a range of finish appearances.

Additionally, an optional bottom surface coating 50 is shown in FIG. 2C, disposed on the substrate bottom surface 44. The bottom surface coating 50 can serve various purposes. The bottom surface coating 50 can uniformly cover the entire substrate bottom surface 44, acting as a barrier to prevent chemical migration from the polyvinyl chloride compounds of the shelf liner 10 onto the application surface 12. Alternatively, the bottom surface coating 50 can be patterned, covering parts of the substrate bottom surface 44 and leaving parts exposed. Such a patterning of the bottom surface coating 50 is useful to vary the non-slip characteristic of the shelf liner 10. The bottom surface coating 50 may be a solvent based polyvinyl chloride resin ink, a water based clear or pigmented polyester ink or coating, a water based clear or pigmented polyurethane clear or pigmented coating, a clear or pigmented UV cured solid coating, or another suitable material. Additionally, fine rubber particles can be admixed with the bottom surface coating 50 material to enhance or alter the non-slip characteristic of the shelf liner 10.

Figure 3:
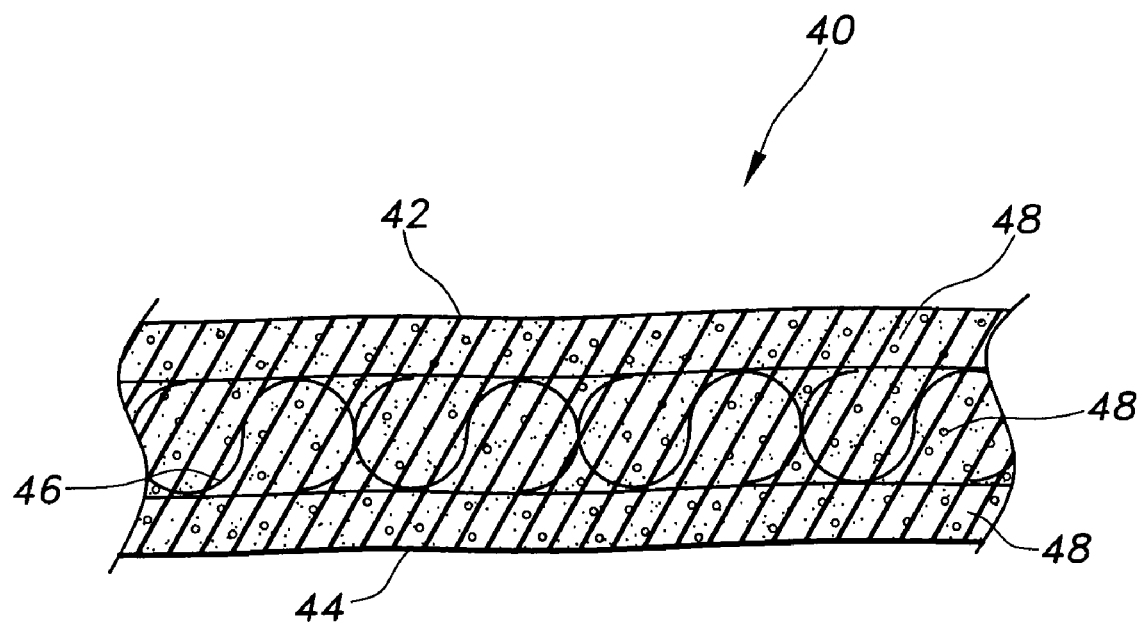
FIG. 3 is a section of a foamed plasticized polyvinyl chloride substrate layer.

Turning now to FIG. 3, the substrate layer 40 comprises a supporting fabric 46 that is coated on each side with foamed, plasticized polyvinyl chloride 48. The supporting fabric 46 is preferably a nonwoven fabric, although woven and scrim fabrics can also be used. The nonwoven fabric is preferably a polyester spun bond material or a synthetic fibrous material. The foamed plasticized polyvinyl chloride 48 is coated onto each side of the supporting fabric 46, giving the substrate layer 40 generally smooth surfaces. In addition to coating both sides of the supporting fabric 46, the supporting fabric 46 may be impregnated with the foamed plasticized polyvinyl chloride 48, the foamed plasticized polyvinyl chloride 48 filling in voids and interstices between fibers of the supporting fabric 46. Thus, the substrate layer 40 may be viewed as a solid layer of foamed plasticized polyvinyl chloride 48 with the supporting fabric 46 embedded within. The supporting fabric 46 may be eliminated entirely, leaving the substrate layer 40 consisting of an unsupported single layer of the foamed plasticized polyvinyl chloride 48.

The substrate layer 40 may be modified by the addition of elastic microspheres to the foamed plasticized polyvinyl chloride 48. The microspheres may be added in varying amounts to vary resilience and thickness of the substrate layer, as well as the non-slip characteristic of the substrate bottom surface 44.

The substrate layer 40 may also be modified by the addition of fine rubber particles to the foamed plasticized polyvinyl chloride 48. The fine rubber particles may be added in varying amounts to vary the non-slip characteristic of the substrate bottom surface 44.

Because the top sheet 20, the plastisol interlayer 30, and the substrate layer 40 are fused together, the shelf liner 10 more closely resembles a continuum of polyvinyl chloride materials rather than discrete layers joined together by an adhesive. This fused construction increases the durability of the shelf liner 10, reducing deformation, curling and delamination.

It can be appreciated that any or all of the polyvinyl chloride materials (including the surface coatings, top sheet, interlayer, and substrate) may also contain additives that are standard in the art, including fillers, pigments, matting agents, UV inhibitors, flame-retardants, biocides and fungicides, and others.

Figure 4:
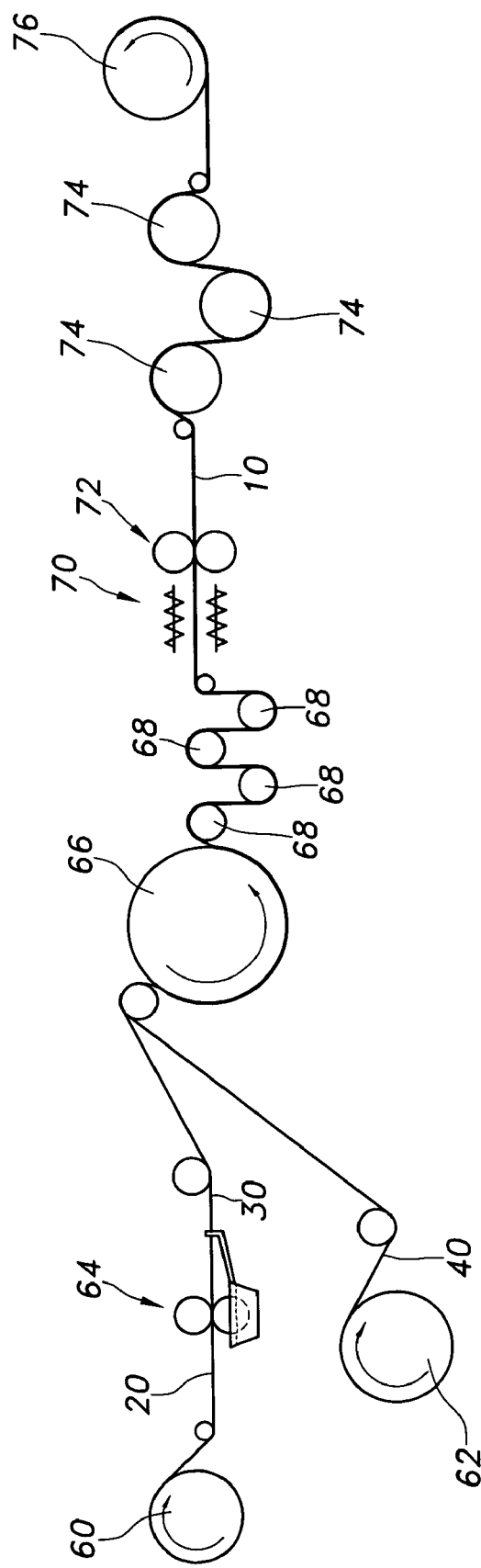
FIG. 4 is a schematic diagram of an apparatus for making a shelf liner according to the present invention.

The shelf liner 10 can be made according to a process that is schematically depicted in FIG. 4. A top sheet supply roll 60 supplies the top sheet 20 material in roll form, delivering the top sheet 20 material at a controlled tension. A substrate layer supply roll 62 supplies the substrate layer 40 material in roll form, delivering the substrate layer 40 material at a controlled tension. Polyvinyl chloride plastisol is applied to the bottom surface of the top sheet 20 by a plastisol coater 64, forming the plastisol interlayer 30. The top sheet 20 and the substrate layer 40 are then brought together, the polyvinyl chloride plastisol coated bottom surface of the top sheet 20 in contact with the top surface of the substrate layer 40 to approximate the layers. The layers are then heated by being transported around a large heating roll 66 and then around several small heating rolls 68. The heating process causes the top sheet 20 and the substrate layer 40, along with the plastisol interlayer 30, to become fused together, forming a cohesive, ionically bonded laminate. Unlike conventional processes used for making shelf coverings, it is not required to apply pressure to the laminate to join the layers. Because pressurization is eliminated, the material thickness and surface smoothness are not deformed in the process.

Following the fusing of the laminate, a pattern may optionally be embossed by additionally heating the laminate, as shown by infrared heaters 70, and passing the laminate between embossing rollers 72. The shelf liner 10 is then cooled by cooling rolls 74, and collected on a take-up roll 76.

Advantageously, the process does not require a pressure nip, as is required by adhesively bonded laminates. The high pressure applied by the pressure nip causes variations in material thickness and surface smoothness. The shelf liner 10 of the present invention avoids such defects by relying on heat fusion to create cohesive bonding.

It is to be understood that the present invention is not limited to the embodiments described above, but encompasses any and all embodiments within the scope of the following claims.

I claim:
1. A shelf liner, comprising:
   a foamed plasticized polyvinyl chloride substrate layer having top and bottom surfaces, the bottom surface being adapted to resist movement in the plane of the bottom surface when the bottom surface contacts a surface of application;
   a nonwoven supporting fabric embedded between the top and bottom surfaces of said substrate layer;
   a plasticized polyvinyl chloride top sheet having top and bottom surfaces, the bottom surface of the plasticized polyvinyl chloride top sheet being fused to the top surface of said foamed plasticized polyvinyl chloride substrate layers;
   a polyvinyl chloride plastisol interlayer disposed between said plasticized polyvinyl chloride top sheet and said foamed plasticized polyvinyl chloride substrate layer; and
   elastic microspheres admixed in said polyvinyl chloride plastisol interlayer.
2. The shelf liner according to claim 1, further comprising fine rubber particles admixed in said foamed plasticized polyvinyl chloride substrate layer.
3. The shelf liner according to claim 1, wherein said plasticized polyvinyl chloride top sheet comprises:
   a thin polyvinyl chloride film having top and bottom surfaces; and
   a decorative coating disposed on said thin polyvinyl chloride film.
4. The shelf liner according to claim 3, wherein said decorative coating is disposed on said top surface of said thin polyvinyl chloride film.
5. The shelf liner according to claim 3, wherein said decorative coating comprises finely ground rubber particles.
6. The shelf liner according to claim 3, wherein:
   said thin polyvinyl chloride film is clear; and
   said decorative coating is disposed on said bottom surface of said thin polyvinyl chloride film.
7. The shelf liner according to claim 1, further comprising:
   a bottom surface coating disposed on the bottom surface of said foamed plasticized polyvinyl chloride substrate layer.
8. The shelf liner according to claim 7, wherein said bottom surface coating partially covers said bottom surface of said foamed plasticized polyvinyl chloride substrate layer.
9. The shelf liner according to claim 7, wherein said bottom surface coating comprises finely ground rubber particles.
10. A shelf liner, comprising:
    a foamed plasticized polyvinyl chloride substrate layer having top and bottom surfaces, the bottom surface being adapted to resist movement in the plane of the bottom surface when the bottom surface contacts a surface of application;

elastic microspheres admixed in said foamed plasticized polyvinyl chloride substrate layer;

whereby said substrate layer is substantially opaque;

a supporting fabric embedded between the top and bottom surfaces of said substrate layer; and a plasticized polyvinyl chloride top sheet having top and bottom surfaces, the bottom surface of the plasticized polyvinyl chloride top sheet being fused to the top surface of said foamed plasticized polyvinyl chloride substrate layer;

wherein said supporting fabric consists of scrim.

11. A shelf liner, comprising:

a foamed plasticized polyvinyl chloride substrate layer having top and bottom surfaces, the bottom surface having a high coefficient of friction in order to resist slipping, and the substrate layer being generally opaque;

elastic microspheres admixed in said foamed plasticized polyvinyl chloride substrate layer;

a supporting fabric embedded between the top surface and the bottom surface of the substrate layer;

a top layer of plasticized polyvinyl chloride film; and an intermediate layer of a plastisol containing plasticizers;

wherein said substrate, said top layer, and said intermediate layer are cohesively bonded together in order to form a flexible, laminated sheet material having a non-slip surface adapted for lining surfaces requiring protection.

* * * * *